(12) United States Patent
Gaudin et al.

(10) Patent No.: US 12,060,119 B2
(45) Date of Patent: Aug. 13, 2024

(54) METHOD FOR ESTIMATING A VALUE OF A FRICTION FORCE EXERTED ON A PART OF A POWER STEERING SYSTEM BY MEANS OF A MATHEMATICAL MODEL

(71) Applicant: JTEKT EUROPE, Irigny (FR)

(72) Inventors: Serge Gaudin, Saint Jean de Touslas (FR); Nicolas Baudouin, Lyons (FR); Pascal Moulaire, La Tour de Salvagny (FR)

(73) Assignee: JTEKT EUROPE, Irigny (FR)

( * ) Notice: Subject to any disclaimer, the term of this patent is extended or adjusted under 35 U.S.C. 154(b) by 414 days.

(21) Appl. No.: 17/604,955

(22) PCT Filed: Apr. 22, 2020

(86) PCT No.: PCT/FR2020/050683
§ 371 (c)(1),
(2) Date: Oct. 19, 2021

(87) PCT Pub. No.: WO2020/217020
PCT Pub. Date: Oct. 29, 2020

(65) Prior Publication Data
US 2022/0177028 A1    Jun. 9, 2022

(30) Foreign Application Priority Data
Apr. 26, 2019 (FR) ................ 19/04489

(51) Int. Cl.
*B62D 5/04* (2006.01)
(52) U.S. Cl.
CPC ........ *B62D 5/0481* (2013.01); *B62D 5/0463* (2013.01)

(58) Field of Classification Search
CPC .. B62D 5/0481; B62D 5/0463; B62D 5/0421; G01L 3/26; G01L 5/221
See application file for complete search history.

(56) References Cited

U.S. PATENT DOCUMENTS 9,776,656 B2    10/2017    Wilhelm et al.
2019/0300050 A1*  10/2019    Kalabic .................. B62D 5/046

FOREIGN PATENT DOCUMENTS

EP    2 735 495 A2    5/2014
WO    2015/140447 A1    9/2015

OTHER PUBLICATIONS

Chen, Wenjie et al., "Dual-Stage Adaptive Friction Compensation for Precise Load Side Position Tracking of Indirect Drive Mechanisms", IEEE Transactions On Control Systems Technology, IEEE Service Center, New York, NY, US, vol. 23, No. 1, Jan. 2015, pp. 164-175, [retrieved on Dec. 15, 2014].
Li, Yijun et al., "Enhancement of Steering Feel of Electric Power Assist Steering System Using Modeling Reference Control", 2018 Annual American Control Conference (ACC), AACC, Jun. 2018, pp. 3257-3262.

(Continued)

*Primary Examiner* — Michael V Kerrigan
(74) *Attorney, Agent, or Firm* — Oliff PLC

(57) ABSTRACT

A method for estimating a value of a friction force exerted on a part of a power steering system of a vehicle, the part of the power steering system including at least one motor exerting a motor torque, the value of the friction force making it possible to modify the motor torque, by means of a mathematical model.

6 Claims, 1 Drawing Sheet

(56) References Cited

OTHER PUBLICATIONS

Weiskircher, Thomas et al. "Rack Force Estimation for Electric Power Steering", Proceedings of the ASME 2015 International Design Engineering Technical Conferences & Computers and Information in Engineering Conference, Aug. 2015.
Sep. 1, 2020 Search Report issued in International Patent Applciation No. PCT/FR2020/050683.

* cited by examiner

[Fig. 1]
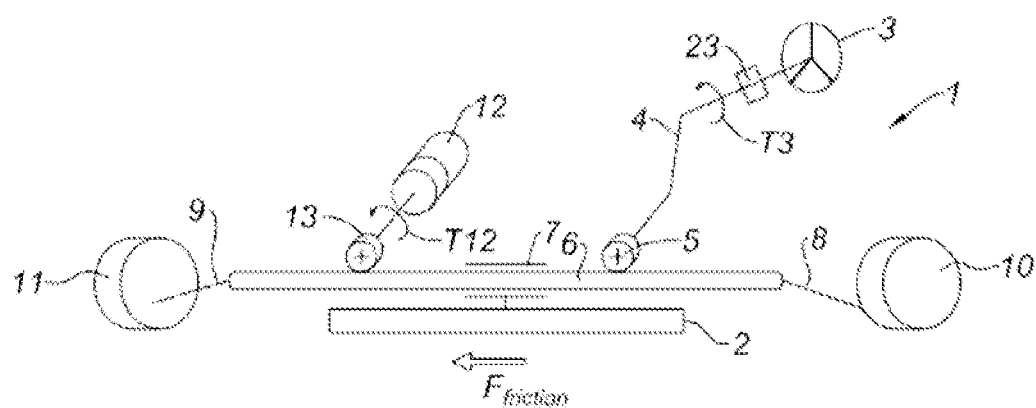
[Fig. 2]
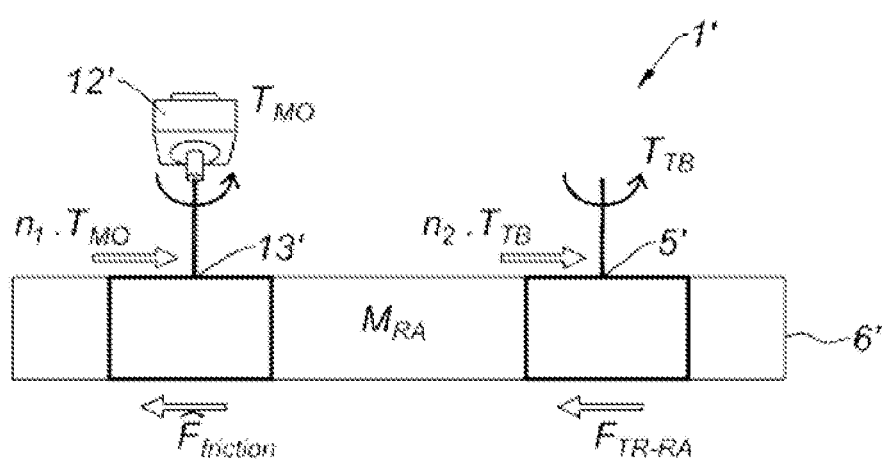

METHOD FOR ESTIMATING A VALUE OF A FRICTION FORCE EXERTED ON A PART OF A POWER STEERING SYSTEM BY MEANS OF A MATHEMATICAL MODEL

The invention concerns the field of power steering systems of the vehicles and more particularly a method for calculating a value of a frictional force exerted on a portion of a power steering system.

A steering system of a vehicle aims at enabling a driver to control a trajectory of the vehicle by modifying an angle of orientation of the wheels of the vehicle by means of a steering wheel. The angle of orientation of the wheels is in particular linked to an angle of the steering wheel. The driver changes the angle of the steering wheel by exerting a force on the steering wheel, hereinafter called "steering wheel torque".

In general, a steering system comprises several elements including said steering wheel, a rack, and two wheels each connected to a tie rod. The rack is the part making it possible to maneuver the wheels, that is to say making it possible to change the angle of orientation of the wheels, via the tie rods. The rack converts the angle of the steering wheel into a rotation of the vehicle's wheels.

A power steering system comprises a computer which determines a control motor torque as a function of the steering steering wheel torque. In this way, the driver will be able to turn more or less easily the steering wheel.

The control motor torque is exerted by a control motor.

In a mechanical-type power steering system, there is a mechanical link, generally made by a steering column, between the steering wheel and the rack. The steering column meshes by means of a steering pinion on the rack. The control motor then exerts the control motor torque indirectly on the steering wheel, by exerting the control motor torque on the rack or on the steering column.

In a "by-wire" type power steering system, the steering wheel angle is measured or calculated so that a maneuvering motor exerting a maneuvering motor torque modifies the orientation of the wheels of the vehicle by means of the rack. The control motor then directly exerts the control motor torque on the steering wheel in particular so as to make the driver aware of a force on the rack.

The components of the power steering system are adjusted relative to each other so that they are in contact. However, tolerances during the production of vehicles, and more generally any variability inherent to the manufacturing method such as a variation in roughness or a variation in dimensions, lead to a variation in a value of a frictional force exerted on the power steering system between two vehicles of the same series, that is to say between two vehicles with similar characteristics.

In addition, the value of the frictional force varies with wear of the parts. Hence, it also varies over time.

In the case of a mechanical-type power steering system, the differences in the values of the frictional force exerted on the power steering system can lead to differences in the driver's driving experience on two vehicles of the same series. However, car manufacturers want the difference in experience between two vehicles of the same series placed under the same conditions to be as low as possible.

In the case of a "by-wire"-type power steering system, the variation in the value of the frictional force exerted on a top portion of the steering system, that is to say on a portion comprising the steering wheel and the control motor, can lead to differences in the driver's driving experience on two vehicles of the same series, whereas the variation in the value of the frictional force exerted on a bottom portion of the steering system, that is to say on a portion comprising the rack and the maneuvering motor, could lead to differences in response to a trajectory between two vehicles of the same series. The variation in the value of the frictional force exerted on a bottom portion of the steering system, that is to say on a portion comprising the maneuvering motor and the rack, could lead to differences in response dynamics upon the same loading of the maneuvering motor between two vehicles of the same series.

Thus, whether in a mechanical-type or "by wire"-type steering system, it is necessary to estimate, throughout the operating time of the vehicle, the value of the frictional force exerted on the power steering system of the vehicle, or on the portion of the power steering system, in order to compensate for this by increasing the control motor torque or the maneuvering motor torque.

There is a known solution (WO2015/140447) making it possible to estimate the value of the frictional force exerted on the power steering system of the vehicle by carrying out, on the one hand, a step of acquiring a series of characterization points corresponding to the measured value of the frictional force associated with the value of the measured assistance force, and on the other hand a step of building an empirical frictional model during which a law of correlation between the characterization points is established.

The drawback laid by this solution is to determine the value of the frictional force by means of a large number of characterization points. This solution therefore requires a long learning time.

In addition, this solution only determines the value of the dry frictions, that is to say independent of a sliding speed, and dynamic, that is to say when the elements in contact are in motion.

The invention aims at overcoming all or part of the aforementioned drawbacks by proposing an estimate of the value of the immediate frictional force and taking into account a large number of physical phenomena.

The invention relates to a method for estimating a value of a frictional force exerted on a portion of a power steering system of a vehicle, said portion of the power steering system comprising at least one motor exerting a motor torque, said value of the frictional force making it possible to modify the motor torque, characterized in that it comprises the following steps:
  determining a portion of a model power steering system corresponding to a mathematical model virtually representing the portion of the power steering system,
  measuring, on the portion of the power steering system, a value of at least one input variable,
  calculating at least one output parameter by means of the mathematical model and of the at least one input variable,
  measuring, on the portion of the power steering system, a value of at least one output variable representing a physical quantity similar to the at least one output parameter,
  calculating at least one deviation between the at least one output parameter and the at least one output variable,
  correcting a value of at least one internal parameter of said mathematical model as a function of the deviation and of an internal coefficient,
  determining the value of the frictional force from the at least one corrected internal parameter.

The method for estimating the value of the frictional force according to the invention applies to a mechanical-type power steering system; the portion of the power steering system will then correspond to the entire power steering system, the motor being a control motor.

The method for estimating the value of the frictional force according to the invention also applies to a "by wire"-type steering system. The portion of the power steering system will then correspond either to a top portion of the power steering system, the motor being a control motor, or to a bottom portion of the power steering system, the motor being a maneuvering motor.

Thus, the terms "motor" and "motor torque" hereafter denote, depending on the considered portion of the steering system, the control motor and the control motor torque or the maneuvering motor and the maneuvering motor torque.

Determining the value of the frictional force makes it possible to modify, by increasing or decreasing, the value of the motor torque so as to reach a target frictional value. In other words, by modifying the motor torque, it is possible to more or less compensate the value of the frictional force so that two vehicles of the same series have equivalent behaviors.

In order to facilitate reading subsequently, the portion of the power steering system on which the value of the frictional force is estimated will be designated solely by the terms "steering system".

The method according to the invention determines a mathematical model representing in a simplified manner the studied steering system. In other words, the mathematical model is a simplified virtual representation of the studied actual steering system. Hereinafter, the simplified representation of the studied steering system will be called the model power steering system. This mathematical model comprises at least one input parameter, at least one output parameter, at least one internal coefficient, and at least one internal parameter, one of which is a value of the frictional force exerted on the virtual representation.

More specifically, the input and output parameters correspond to a variable of the physical system that could be measured on the physical system whereas the internal parameter corresponds to a variable of the physical system that cannot be measured. The internal coefficient allows a correction of the internal parameter so as to cause the value of the internal parameter to tend towards that of the corresponding variable of the physical system.

The method seeks to estimate the internal parameter corresponding to the value of the frictional force exerted on the actual steering system.

For this purpose, at least one input variable is measured on the actual steering system. The at least one input variable represents a physical quantity, that is to say a physical property, identical to the at least one input parameter of the mathematical model.

With this input parameter, corresponding to the input variable, at least one output parameter of the mathematical model is calculated.

Then, on the actual steering system, at least one output variable representing a physical quantity identical to the at least one output parameter of the mathematical model is measured.

Then a deviation between the output parameter and the output variable which will be called prediction error is calculated.

The more representative is the mathematical model of the actual steering system, the smaller the prediction error will be. In other words, when the mathematical model is perfect, the prediction error is zero, that is, the measured output variable and the output parameter are equal.

Thus, in order to make the mathematical model more representative of the actual steering system, the at least one internal parameter of the mathematical model is modified, or in other words corrected, as a function of the prediction error and via an application of an internal coefficient. In the absence of information about the actual steering system, these internal parameters are predetermined, and therefore not very representative of the physical quantities to which they correspond on the actual steering system. The correction of these internal parameters as a function of the prediction error makes it possible to make their value tend towards that of the non-measurable physical quantity which they represent. This therefore makes it possible to obtain an estimate of these non-measurable physical quantities.

However, the value of the frictional force exerted on the virtual representation is part of the internal parameters of the mathematical model.

Finally, the value of the frictional force exerted on the actual steering system is determined as equal to the value of the frictional force exerted on the virtual representation when the mathematical model has been corrected.

The method according to the invention estimates for each measurement of at least one input variable and at least one output variable on the actual steering system, the value of the frictional force of the actual steering system. By at least two measurements on the steering system at a given time point, the method estimates the value of the frictional force exerted on the steering system at the given time point. The estimation of the value of the frictional force is substantially immediate, compared to the calculation time. In other words, there is no need to take measurements on the steering system at a plurality of different time points to obtain the desired estimate.

In addition, the method according to the invention takes into account a large number of physical phenomena linked to different types of friction such as lubrication phenomena associated with the Stribeck curve, viscous phenomena, phenomena of bonding stiffness, that is to say, the stiffness determined in a model in which two solids are in contact via flexible lamellae. In this way, the method makes a very accurate estimate of the value of the frictional force.

According to a feature of the invention, the method measures, on the portion of the power steering system, a value of a plurality of input variables.

According to a feature of the invention, the method calculates a plurality of output parameters.

According to a feature of the invention, the method measures, on the portion of the power steering system, a value of a plurality of output variables representing a plurality of physical quantities similar to the plurality of output parameters.

According to a feature of the invention, the method measures a plurality of deviations between the plurality of output parameters and the plurality of output variables.

According to a feature of the invention, the method corrects a value of a plurality of internal coefficients of said mathematical model as a function of at least one deviation.

According to a feature of the invention, the mathematical model is a 1-order mathematical model, comprising a model mass, equivalent to a set of inertias of the portion of the model power steering system, which is subjected to at least one force exerted on the portion of the model power steering system.

A 1-order mathematical model corresponds to a reduction in the complexity of an actual steering system composed of several solids in relative motion, so as to represent this system only by one single mass.

Thus, the mathematical model is simple. This allows for a simple software implementation and a reduction in the consumption of a resource of a computer.

The at least one force exerted on the portion of the model power steering system corresponds to at least the frictional force that needs to be determined on the actual steering system.

According to a feature of the invention, the frictional force of the mathematical model is determined by a LuGre model.

The frictional force is modeled by the LuGre model according to the following expressions:

$$\hat{F}_{friction} = \hat{\sigma}_0 + \hat{z} + \sigma_1 \cdot h(v) \cdot \hat{z} + \hat{\sigma}_2 \cdot v \qquad \text{[Math 1]}$$

$$\hat{z} = v - \hat{\sigma}_0 \cdot \frac{|v|}{g(v)} \cdot \hat{z} \qquad \text{[Math 2]}$$

$$g(v) = F_c + (F_s - F_c) \cdot \exp\exp\left(-\left(\frac{v}{v_s}\right)^2\right) \qquad \text{[Math 3]}$$

$$h(v) = \frac{v_d}{v_d + |v|} \qquad \text{[Math 4]}$$

with:
$\hat{\sigma}_0 \hat{\sigma}_1, \hat{\sigma}_2$: internal parameters of the mathematical model, representing respectively a bonding stiffness, an internal damping, and a viscous coefficient of friction according to a LuGre model;
$\hat{z}$: internal state of the LuGre model
v: rotational speed of the motor corresponding to the speed of the model mass
$v_s$: "Stribeck speed", that is to say a parameter of the LuGre model controlling a shape of the Stribeck curve which describes the transition between static and dynamic frictions
$v_d$: an internal parameter of the LuGre model
$F_c$: A friction level
$F_s$: A static friction level According to a feature of the invention, the at least one internal coefficient enabling the correction of the at least one internal parameter is determined by an application of Lyapunov theorem.

Lyapunov theorem enables by proving the existence of a positive definite mathematical function, called "of Lyapunov", dependent on the estimation errors between:
the estimation errors between the output parameter of the mathematical model and the output variables of the physical system on the one hand, known as prediction errors
the estimation errors between the internal parameters of the mathematical model and the value of the corresponding physical quantities of the actual system on the other hand,
and whose derivative is negative semi-definite, to prove that these estimation errors are bounded and that the system is stable.

It is furthermore possible to show that, if the derivative of the Lyapunov function is defined negative when the prediction errors are non-zero, then these prediction errors converge towards zero.

The expression of a function thus defined then makes it possible to determine the expression of the at least one internal coefficient of the model in a mathematical manner, making it possible to ensure that the behavior of this model converges towards that of the actual system that it represents.

According to a feature of the invention, the at least one input variable is chosen from: the motor torque, a steering wheel torque, a lateral acceleration of the vehicle, or a force on the tie rods.

Thus the method uses variables generally measured in a steering system.

The input variable depends on the studied steering system and the selected mathematical model.

In the case of a mechanical-type steering system, the at least one input variable is selected from: the motor torque, a steering torque, or a lateral acceleration of the vehicle. Preferably, three input variables are determined corresponding to the motor torque, the steering wheel torque and the lateral acceleration of the vehicle.

According to a feature of the invention, the output parameter and the output variable correspond to a rotational speed of the motor.

The rotational speed of the motor ensures on the one hand a better representation of the dynamic behavior of the steering system than a position of the motor, and on the other hand it allows for a measurement easier than an acceleration of the motor.

The invention will be better understood, thanks to the description hereinafter, which relates to an embodiment according to the present invention, given as a non-limiting example and explained with reference to the appended schematic drawings, in which:

FIG. 1 is a schematic representation of a mechanical-type power steering system of a vehicle FIG. 2 is a simplified representation of the power steering system of FIG. 1.

The invention concerns a method for estimating a value of a frictional force exerted on at least one portion of a power steering system 1 of a vehicle 2, and more particularly for a motor vehicle 2 intended for transporting passengers.

The power steering system 1 described below is of the mechanical type.

In a manner known per se, and as shown in FIG. 1, said power steering system 1 comprises a steering wheel 3 which allows a driver to maneuver said power steering system 1 by exerting a force, called "steering wheel torque" T3, on said steering wheel 3.

Said steering wheel 3 is preferably mounted on a steering column 4, guided in rotation on the vehicle 2, and which meshes, by means of a steering pinion 5, on a rack 6, which is itself guided in translation in a steering casing 7 fastened to said vehicle 2.

Preferably, each of the ends of said rack 6 is connected to a steering tie rod 8, 9 attached to the steering knuckle of a steered wheel 10, 11 (respectively a left wheel 10 and a right wheel 11), such that the longitudinal translational movement of the rack 6 makes it possible to modify the turning angle (yaw angle) of the steered wheels.

Moreover, the steered wheels 10, 11 can preferably also be driving wheels.

The power steering system 1 also comprises a control motor 12 intended to output a control torque T12, to assist the maneuvering of said power steering system 1.

The control motor 12 will preferably be an electric motor, with two operating directions, and preferably a rotary electric motor, of the brushless type.

The control motor 12 can engage, where appropriate via a reducer of the gear reducer type, either on the steering column 4 itself, to form a so-called "single pinion" mechanism, or directly on the rack 6, for example by means of a second pinion 13 separate from the steering pinion 5 which enables the steering column 4 to mesh with the rack 6, so as to form a so-called "double pinion" mechanism, as illustrated in FIG. 1, or else by means of a ball screw which cooperates with a corresponding thread of said rack 6, at a distance from said steering pinion 5.

The method of estimating the value of the frictional force according to the invention is exerted on a portion of the power steering system 1. In the case explained below, the portion of the power steering system corresponds to the entire power steering system 1 as represented in FIG. 1 and downstream of a torque sensor 23 measuring the steering wheel torque T3, that is to say the steering system comprising the rack 6 up to the torque sensor 23.

The method comprises a step of determining a portion of a model power steering system corresponding to a mathematical model representing the power steering system 1. The portion of the model power steering system 1' used in the invention is a simplified representation of the power steering system 1 as represented in FIG. 2. In the example depicted in FIGS. 1 and 2, the portion of the model power steering system 1' will be referred to as the model power steering system 1'.

To simplify a software implementation and reduce a resource consumption of a computer of the power steering system 1, said power steering system 1 is represented in the method according to the invention by the mathematical model which is a simplified virtual representation of the actual studied steering system 1.

The mathematical model is a 1-order system.

More specifically, the mathematical model, corresponding to the model power steering system 1', comprises a model rack 6' on which a model steering pinion 5' is exerted and a model control motor 12' engaging the model rack 6' by means of a second model pinion 13'.

The mathematical model comprises one single model mass M, corresponding to a set of the inertias of the model power steering system 1'.

The model mass M is written according to the formula:

$$M = m_{RA} + n_1^2 \cdot J_{MO} + n_2^2 \cdot J_{DRP} \qquad \text{[Math 5]}$$

with:
$m_{RA}$: mass of the model rack 6'
$J_{MO}$: inertia of the model control motor 12'
$J_{DRP}$: inertia of the model steering pinion 5'
$n_1$: reduction ratio of the reducer+second model pinion 13' set
$n_2$: reduction ratio of the model steering pinion 5'

It is determined that the model mass M is subjected to at least one force exerted on the model power steering system 1'. In the example, the model mass M is subjected to 4 forces:
- a model motor force $T_{MO}$ which is equivalent to the control torque T12 of the control motor 12 in the actual power steering system 1,
- a model driver force $T_{TB}$ which is substantially equivalent to the steering wheel torque T3 measured by a torque sensor 23 in the actual power steering system 1, except for the frictional values at the level of the steering column 4,
- a model tie rod force $F_{TR-RA}$ which is equivalent to a force applied by the steering tie rods 8, 9 on the rack 6. This force is not measured directly, it is estimated from a lateral acceleration $\gamma$ of the vehicle according to the following linear relationship:

$$F_{TR-RA} = -\hat{G}\gamma \qquad \text{[Math 6]}$$

With $\hat{G}$: an internal parameter representing a coefficient of proportionality between a transverse force and a lateral acceleration of the vehicle, in a domain of linear behavior of the tires,
- a model frictional force $F_{Friction}$ which is equivalent to a frictional force $F_{Friction}$ exerted on the actual power steering system 1.

It is also determined that the model frictional force $\hat{F}_{Friction}$ is modeled by a LuGre model according to the following expressions:

$$\hat{F}_{friction} = \hat{\sigma}_0 + \hat{z} + \sigma_1 \cdot h(v) \cdot \hat{z} + \hat{\sigma}_2 \cdot v \qquad \text{[Math 7]}$$

$$\dot{\hat{z}} = v - \hat{\sigma}_0 \cdot \frac{|v|}{g(v)} \cdot \hat{z} \qquad \text{[Math 8]}$$

$$g(v) = F_c + (F_s - F_c) \cdot \exp\exp\left(-\left(\frac{v}{v_s}\right)^2\right) \qquad \text{[Math 9]}$$

$$h(v) = \frac{v_d}{v_d + |v|} \qquad \text{[Math 10]}$$

with:
$\hat{\sigma}_0, \hat{\sigma}_1, \hat{\sigma}_2$: internal parameters of the mathematical model, representing respectively a bonding stiffness, an internal damping, and a viscous coefficient of friction according to a LuGre model,
$\hat{z}$: an internal state of the LuGre model
$v$: rotational speed of the control motor 12 corresponding to the speed of the model mass M
$v_s$: "Stribeck speed", that is to say a parameter of the LuGre model controlling a shape of the Stribeck curve which describes the transition between static and dynamic frictions
$c_d$: an internal parameter of the LuGre model
$F_c$: A friction level
$F_s$: A static friction level When the LuGre model is applied to the considered model power steering system, we obtain:

$$\dot{v} = \frac{1}{M}\left(RFE - \hat{F}_{Friction} + \hat{G}\gamma + \hat{D}\right) \qquad \text{[Math 11]}$$

$$\dot{\hat{z}} = v - \hat{\sigma}_0 \cdot \frac{|v|}{g(v)} \cdot \hat{z} \qquad \text{[Math 12]}$$

$$\hat{F}_{Friction} = \hat{\sigma}_0 \cdot \hat{z} + \sigma_1 \cdot \left(v - \hat{\sigma}_0 \cdot \frac{|v|}{g(v)} \cdot \hat{z}\right) + \hat{\sigma}_2 \cdot v \qquad \text{[Math 13]}$$

With:
$\dot{v}$: the acceleration of the model mass M,
RFE: the sum of the model motor force $T_{MO}$ and the model driver force $T_{TB}$, expressed in the reference of the rack 6
$\hat{D}$: internal parameter corresponding to a possible constant error on the measurements, such as for example the presence of an offset on the measurements of the steering wheel torque T3 or of the lateral acceleration $\gamma$ of the vehicle
$\dot{\hat{z}}$: derivative of the internal state of the LuGre model In order to make the mathematical model representative of the actual steering system 1, only the model mass M could be assumed to be known. The other internal parameters $\hat{\sigma}_0, \hat{\sigma}_1, \hat{\sigma}_2, \hat{D}, \hat{G}, \hat{z}$ are too variable to be accurately estimated a priori.

The method also comprises a step of measuring, on the power steering system 1, a value of at least one input variable. In the example of FIGS. 1 and 2, the input variables are the control torque T12 of the control motor 12, the steering wheel torque T3, and the lateral acceleration γ of the vehicle.

The method then comprises a step of calculating at least one output parameter by means of the mathematical model and of the at least one input variable.

The step of calculating at least one output parameter makes it possible to determine the speed $\hat{v}$ of the model mass M corresponding to the rotational speed v of the control motor 12 as a function of the input variables. More specifically, the input variables are integrated in the mathematical model described above, which makes it possible to deduce the speed D of the model mass M.

The method then comprises a step of measuring, on the portion of the power steering system 1, a value of at least one output variable representing a physical quantity similar to the at least one output parameter.

During the step of measuring a value of at least one output variable, the rotational speed v of the control motor 12 is measured on the power steering system 1. The method comprises a step of calculating at least one deviation e between the at least one output parameter and the at least one output variable.

In other words, the deviation e is equal to the at least one output variable minus the at least one output parameter.

In the present case, the deviation e is equal to the speed P of the model mass M minus the rotation speed v of the control motor 12.

$$e = \hat{v} - v \qquad \text{[Math 14]}$$

The deviation e, also called the prediction error, symbolically represents imperfections in the mathematical model. In other words, when the mathematical model is perfect, the deviation e is zero.

The method comprises a step of correcting a value of at least one internal parameter of said mathematical model as a function of the prediction error.

In this way, the mathematical model is corrected in order to make it more representative of the power steering system 1. To correct the mathematical model, the values of the internal parameters $\hat{\sigma}_0 \hat{\sigma}_1$, $\hat{\sigma}_2$, $\hat{D}$, $\hat{G}$, $\hat{z}$ are modified.

The modification of the values of the internal parameters $\hat{\sigma}_0 \hat{\sigma}_1$, $\hat{\sigma}_2$, $\hat{D}$, $\hat{G}$, $\hat{z}$ requires solving equations, not reproduced here, which reveal nonlinear terms.

To solve this problem, it is known to dissociate the nonlinear terms using a structure comprising two estimates of the internal state z. Then expressions of the internal coefficients are defined after applying Lyapunov theorem.

The method comprises a step of determining the value of the frictional force from the at least one corrected internal parameter.

Finally, the model frictional force $\hat{F}_{friction}$ corresponding to the frictional force $\hat{F}_{friction}$ exerted on the actual power steering system 1 can then be determined according to the equation:

$$\hat{F}_{friction} = \hat{\sigma}_0 \hat{z}_0 + \hat{\sigma}_1 h(v)\left(v - \frac{|v|}{g(v)} \cdot \hat{z}_1\right) + \hat{\sigma}_2 v \qquad \text{[Math 15]}$$

With:
$\hat{\sigma}_0 \hat{\sigma}_1$, $\hat{\sigma}_2$: internal parameters of the mathematical model, representing respectively a bonding stiffness, an internal damping, and a viscous coefficient of friction according to a LuGre model, $\hat{z}$: internal state of the LuGre model v: rotational speed of the control motor 12 corresponding to the speed of the model mass M Determining the value of the frictional force makes it possible to modify, by increasing or decreasing, the value of the control torque T12 so as to reach a target frictional value. In other words, by modifying the control torque T12, it is possible to more or less compensate the value of the frictional force so that two vehicles of the same series have equivalent behaviors.

Of course, the invention is not limited to the embodiments described and represented in the appended figures. Modifications are still possible, in particular with regards to the constitution of the various elements or by substitution of technical equivalents, yet without departing from the scope of protection of the invention.

The invention claimed is:

1. A method of estimating a value of a frictional force exerted on a portion of a power steering system of a vehicle, said portion of the power steering system comprising at least one motor exerting a motor torque, said value of the frictional force making it possible to modify the motor torque, wherein it comprises the following steps:
    determining a portion of a model power steering system corresponding to a mathematical model virtually representing the portion of the power steering system, wherein the mathematical model comprises a frictional force model,
    measuring, on the portion of the power steering system, a value of at least one input variable,
    calculating at least one output parameter by means of the mathematical model and the at least one input variable,
    measuring, on the portion of the power steering system, a value of at least one output variable representing a physical quantity similar to the at least one output parameter,
    calculating at least one deviation between the at least one output parameter and the at least one output variable,
    correcting a value of at least one internal parameter of said mathematical model as a function of the deviation and of an internal coefficient,
    determining the value of the frictional force from the at least one corrected internal parameter.

2. The estimation method according to claim 1, wherein the mathematical model is a 1st-order mathematical model, comprising a model mass, equivalent to a set of inertias of the portion of the model power steering system, which is subjected to at least one force exerted on the portion of the model power steering system.

3. The estimation method according to claim 1, wherein the frictional force of the mathematical model is determined by a LuGre model.

4. The estimation method according to claim 1, wherein the internal coefficient enabling the correction of the at least one internal parameter is determined by an application of Lyapunov's theorem.

5. The estimation method according to claim 1, wherein the at least one input variable is selected from: the motor torque, a steering wheel torque, a lateral acceleration of the vehicle or a force on the tie rods.

6. The estimation method according to claim 1, wherein the output parameter and the output variable correspond to a rotational speed of the motor.

\* \* \* \* \*